United States Patent [19]

Chizaki

[11] Patent Number: 4,954,044

[45] Date of Patent: Sep. 4, 1990

[54] METHOD AND MECHANISM FOR ORIENTATING CUP BODIES FOR A SYSTEM FOR AUTOMATICALLY CONNECTING HANDLES TO THE CUP BODIES

[75] Inventor: Isao Chizaki, Toki, Japan

[73] Assignee: Shin-Ei Kiko Co., Ltd., Nagoya, Japan

[21] Appl. No.: 399,309

[22] Filed: Aug. 28, 1989

[30] Foreign Application Priority Data

Nov. 30, 1988 [JP] Japan .............................. 63-303483

[51] Int. Cl.[5] ............................................... B25J 1/00

[52] U.S. Cl. .................................. 414/754; 356/152; 414/781; 198/394; 198/395

[58] Field of Search ............... 474/754, 772, 779, 781, 474/786; 356/152, 138, 426, 428, 394; 33/545, 546, 547; 198/376, 378, 394, 395; 901/46, 47

[56] References Cited

U.S. PATENT DOCUMENTS

| | | | |
|---|---|---|---|
| 3,302,786 | 2/1967 | Conrad | 356/428 X |
| 3,313,943 | 4/1967 | Sager | 414/754 X |
| 3,618,742 | 11/1971 | Blanchard | 198/395 |

OTHER PUBLICATIONS

Advertisement Distributed by Service Engineers Ltd. Entitled "Handle Attaching Machine".

*Primary Examiner*—Frank E. Werner
*Assistant Examiner*—James T. Eller, Jr.
*Attorney, Agent, or Firm*—Lahive & Cockfield

[57] ABSTRACT

A mechanism for automatically orientating cup bodies includes a cup-body rotating element, an element for measuring a peripheral configuration of the side wall of a cup body, and a central control element for comparing the peripheral configuration of the side wall thereof with a peripheral configuration of the side wall of a sample cup body as determined in advance. The central control element determines whether the two peripheral configurations coincide with each other, and determines the angle by which the cup body is to be rotated to orientate it in a selected direction for the connection of a handle thereto at a predetermined position thereon if the two peripheral configurations do not coincide with each other. Then, the central control element rotates the cup-body rotating element by the required angle to orientate the cup body in the selected direction.

5 Claims, 7 Drawing Sheets

F/G. 2(a)
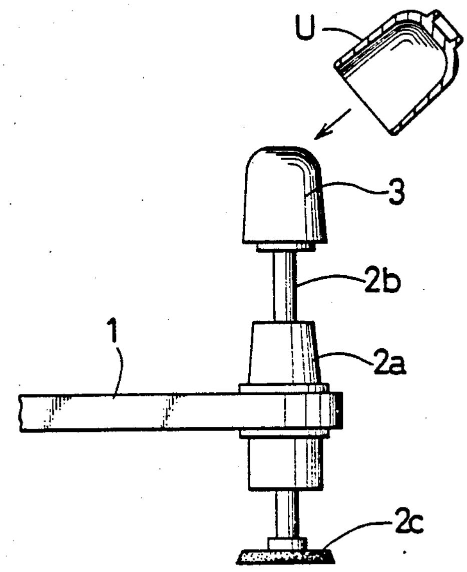
F/G. 2(b)
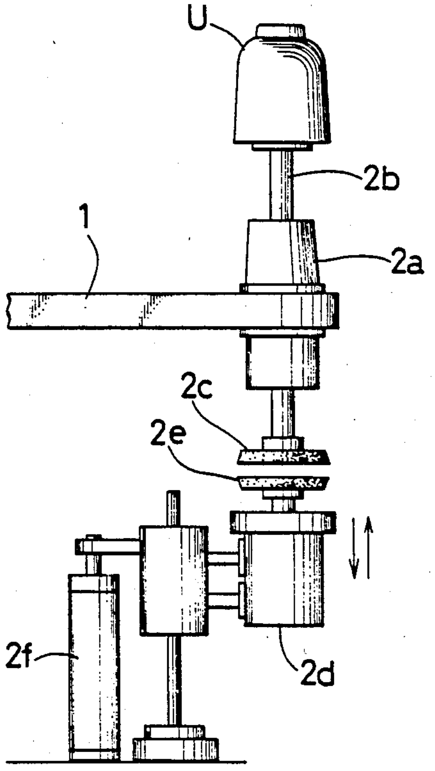

METHOD AND MECHANISM FOR ORIENTATING CUP BODIES FOR A SYSTEM FOR AUTOMATICALLY CONNECTING HANDLES TO THE CUP BODIES

FIELD OF THE INVENTION

This invention relates to a method and mechanism for orientating unfired ceramic cup bodies for a system for automatically connecting unfired ceramic handles to the cup bodies.

BACKGROUND OF THE INVENTION

The conventional system for connecting handles to cup bodies includes an apparatus for automatically centering a cup body installed on a seat on a movable table and an apparatus for automatically connecting a handle to the cup body centered on the seat. If a cup body is a cylindrical one with no design or pattern on its side wall and with the same diameter at any horizontal cross section thereof, a handle may be correctly connected to the cup body provided that the connection thereof is made at a predetermined height of the side wall of the cup body. Such is also the case with a cup body with different diameters at different horizontal cross sections, but with a true circle at any horizontal cross section thereof. In other words, it may be said that such a cup body has nothing on its side wall which provides a particular direction in which to orientate the cup body. Thus, with the conventional system, handles may be almost automatically connected to a desired number of cup bodies with the same such shapes. However, if, for example, a cup body is a polygonal one, the operation of connecting a handle to such a cup body requires not only observing the predetermined height of connection of the handle, but also orientating the cup body in the right, i.e. as specified or selected, direction for the connection thereof. For example, if a cup body is a polygonal one, usually a handle must be connected as shown in FIG. 8(*a*), not as shown in FIG. 8(*b*). Such is also the case with a cup body having a design or pattern on its side wall on which a handle should not be connected. The conventional system, however, has no mechanism for orientating cup bodies in the right direction. Therefore, so far cup bodies have been orientated manually one by one in the right direction.

SUMMARY OF THE INVENTION

Accordingly it is an object of the invention to provide a mechanism for automatically orientating cup bodies for a system for automatically connecting handles to the cup bodies.

Another object of the invention is to provide a method for automatically orientating cup bodies for such a system.

An automatic cup-body orientating mechanism according to the invention comprises (a) a cup-body rotating means, (b) means for measuring a peripheral configuration of a side wall of a cup body conveyed from the cup-body loading position by the transport means, while the cup body is rotated for 360 degrees about a central vertical axis thereof by the cup-body rotating means, (c) a central control means for comparing the peripheral configuration of the side wall of the cup body and a peripheral configuration of a side wall of a sample cup body as determined in advance, determining whether the two peripheral configurations coincide with each other, and determining an angle by which the cup body is to be rotated to orientate in a right direction for the connection of a handle to the cup body at a predetermined position thereon if the two peripheral configurations do not coincide with each other, and (d) means for rotating the cup-body rotating means by said angle to orientate the cup body in the right direction. The foregoing measuring means may comprise (i) scanner means for scanning a laser beam along a periphery of the side wall of the cup body, receiving reflected lights resulting from the impingement of the laser beam on the cup body, and generating detection signals in response to the reflected lights received and (ii) means for receiving the detection signals from the scanner means and providing said central control means, in response to the detection signals, with voltage signals which represent the peripheral configuration of the cup body. The foregoing cup-body rotating means may include a pulse motor and a pair of clutch plates which may be engaged with each other to transmit the rotation of the pulse motor to the cup body.

According to the invention, a method for orientating cup bodies comprises (i) installing a first, or sample cup body on a seat on a cup-body transport means, in a cup-body loading position, such that the sample cup body is orientated in a right direction for the connection of a handle thereto at a predetermined position thereon, (ii) measuring the configuration of a periphery of a side wall of the sample cup body moved to an orientating position, while rotating the cup body for 360 degrees about a central vertical axis thereof, (iii) installing a second cup body on a seat on the cup-body transport means, in the cup-body loading position, without regard to what direction the second cup body is orientated, (iv) measuring the configuration of the same periphery of a side wall of the second cup body as the periphery of the side wall of the sample cup body, (v) comparing the two peripheral configurations to determine whether the two peripheral configurations coincide with each other, (vi) determining an angle by which the second cup body is to be rotated to orientate in the right direction for the connection of a handle to thereto at the predetermined position thereon, if the two peripheral configurations have not coincided with each, and (vii) rotating a cup-body rotating means by said angle to orientate the second cup body in the right direction.

With regard to a cup body with a design or pattern on its side wall on which a handle should not be connected, the invention makes it possible to orientate such a cup body correctly as long as the design or pattern is a projecting portion on the side wall which, like a side edge of a polygonal cup body, can be recognized as a transition in the peripheral configuration of the cup body by the periphery measuring means.

BRIEF DESCRIPTION OF THE DRAWING

FIG. 2(*a*) shows one of cup supports provided on a turntable of the system of FIG. 1. The cup support shown in FIG. 2(*a*) is a position A of FIG. 1;

FIG. 2(*b*) also shows one of the cup supports, but the cup support shown in FIG. 2(*b*) is in a position C of FIG. 1 with a cup body installed thereon;

FIG. 4(*b*) shows a waveform formed by voltage signals obtained from a cup body to be orientated in the right direction;

FIG. 4(*c*) shows the comparison of the waveform of FIG. 4(*a*) and that of FIG. 4(*b*);

FIG. 8(*b*) shows a handle connected to a cup body orientated in the wrong direction.

DETAILED DESCRIPTION OF THE PREFERRED EMBODIMENT

Figure 1:
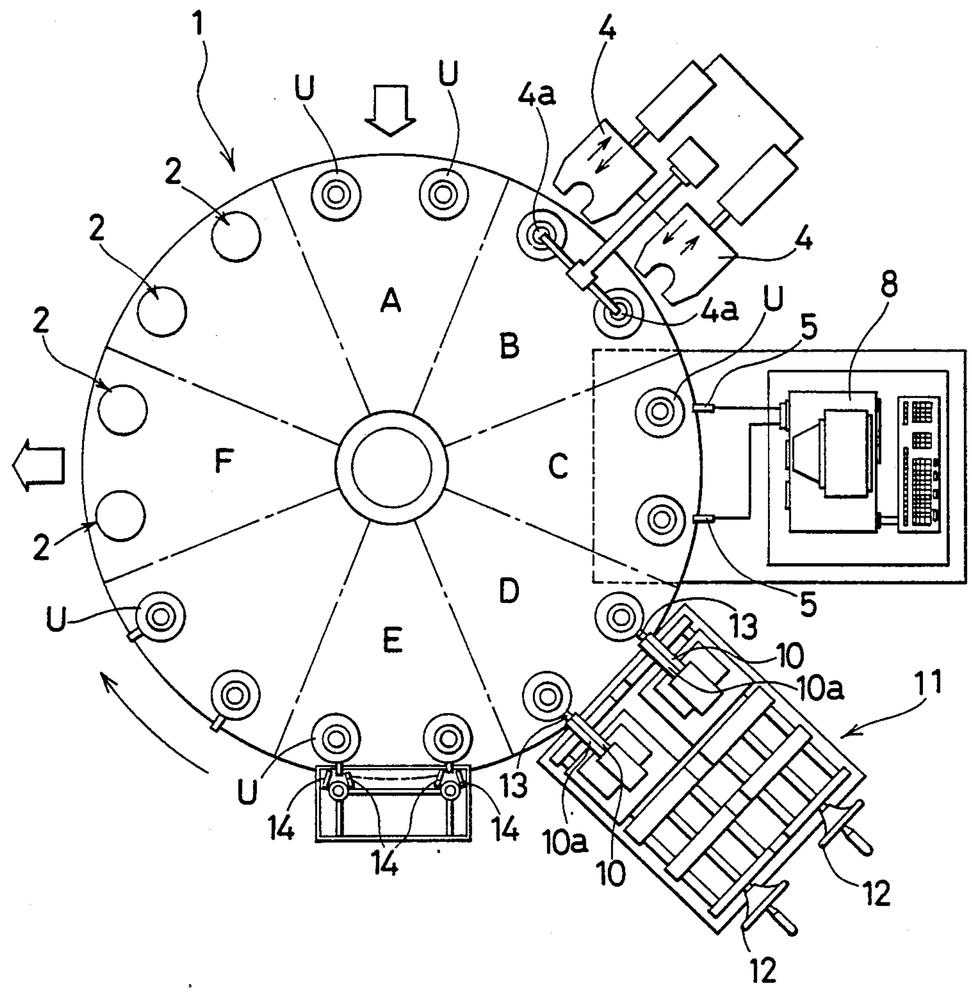
FIG. 1 shows a turntable-type system for automatically connecting handles to cup bodies.
Figure 3:
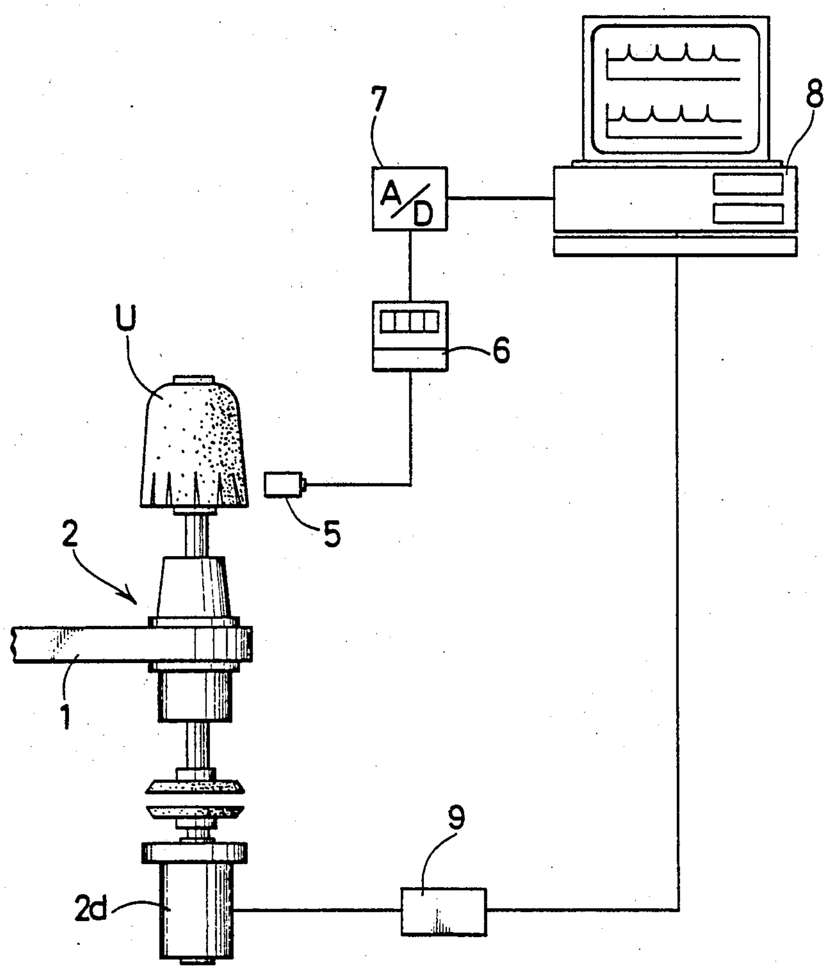
FIG. 3 shows a cup-body orientating mechanism according to the invention.

Referring to the drawing, description will now be made of a cup-body orientating mechanism which embodies the invention in a preferred form. The cup-body orientating mechanism illustrated in the drawing is used for a turntable-type system for automatically connecting handles to cup bodies, but may be used for other type of such a system. In FIG. 1 the system includes a turntable 1. The turntable 1 is divided into eight equal radially-extending sections as shown by dot-dash-lines. Six different fixed positions A to F are set for each of the eight sections of the turntable 1. As will hereinafter become apparent, different operations are made on the eight sections of the turntable 1.

Each of the eight sections of the turntable 1 is provided with a pair of cup supports 2 which are spaced apart from each other along the circumference of the turntable 1. The turntable 1 is rotated intermittently in a clockwise direction by a driving mechanism (not shown). The turntable 1 is rotated for one eighth of 360 degrees at a time.

Each cup support 2 includes a vertical shaft **2*b* extending through the turntable 1 and a bearing 2*a*. A seat 3 is removably connected to the top of the shaft 2*b*. The seat 3 is shaped to conform to the inner surface of a cup body U which is to be installed thereon. A clutch plate 2*c* is connected to the lower end of the shaft 2*b***.

When each section of the turntable 1 has come to the position A, two ceramic cup bodies U are installed bottom up on the seats 3 of the respective cup supports 2. In FIG. 2(*a*) a cup body U is about to be installed thereon. Each time the turntable 1 is rotated intermittently, each section thereof moves to the next position. After the cup bodies U have been installed on the seats 3, the turntable 1 is rotated to move the cup bodies U to the next position B.

A centering apparatus is located adjacent to the position B. The centering apparatus includes a pair of plates 4 and a pair of press means **4*a*. If each cup body U has been installed on the seat 3 correctly, or in such a manner that the center of the cup body U coincides with the center of the seat 3, the cup body U need not be subjected to any operation in the position B. However, if the cup body U has been incorrectly installed on the seat 3, the cup body U is centered on the seat 3 as follows: The associated plate 4 is advanced, and is operated to lift the cup body U slightly, and subsequently the associated press means 4*a* is operated to press the cup body U to center the cup body U on the seat 3. That is, if each cup body U has been incorrectly installed in the position A, the cup body U is reset on the seat 3** in the next position B. Subsequently the cup bodies U are moved to the next position C.

A periphery measuring apparatus according to the invention is located adjacent to the position C. This measuring apparatus includes a pair of scanners 5 which generate laser beams and scan the respective cup bodies U on the seats 3 with the laser beams and receive reflected lights resulting from the impingement of the laser beams on the cup bodies U. Also, below the position C are located a pair of means for rotating the shafts **2*b* and, hence, the seats 3 of the respective cup supports 2. Each rotating means include a pulse motor 2*d* having an upwardly-extending shaft which is aligned with the shaft 2*b* when each section of the turntable is in the position C. A clutch plate 2*e* is connected to the top of the shaft of the pulse motor 2*d*. The pulse motor 2*d* is connected to a cylinder 2*f*. The cylinder 2*f* is operated to move the pulse motor 2*d* toward or away from the cup support 2. That is, when the seat 3 is to be rotated, the cylinder 2*f* causes the pulse motor 2*d* to move upwardly to bring the clutch plate 2*e* into contact with the clutch plate 2*c*. When it is no longer necessary to rotate the seat 3, the cylinder 2*f* causes the pulse motor 2*d* to move downwardly to disengage the clutch plate 2*e* from the clutch plate 2*c*. The cup support 2** includes a braking means (not shown).

The periphery measuring apparatus and the rotating means constitute a cup-body orientating mechanism.

In the position C each seat 3 and, hence, the cup body U thereon are rotated for 360 degrees while the side wall of the cup body U is scanned with the laser beam from the scanner 5. The scanner 5 generates detection signals as it receives the reflected lights resulting from the impingement of the laser beam on the side wall of the cup body U. The detection signals are sent through a laser displacement meter 6 and an A-D converter 7 to a computer 8. Based on the signals received, the computer 8 determines the peripheral configuration of the cup body U along which the laser beam has been scanned. Thereupon the computer 8 computes the angle by which the cup body U is to be rotated to face in the right direction for the connection of a handle thereto.

A controller 9 is wired to both the computer 8 and the pulse motor **2*d*. Controlled by the computer 8, the controller 9 rotates the pulse motor 2*d* until the cup body U has been rotated by the forgoing angle computed by the computer 8**.

In the position C the cup bodies C are thus orientated in the right directions. Thence the cup bodies C are moved to the next position D.

Figure 6:
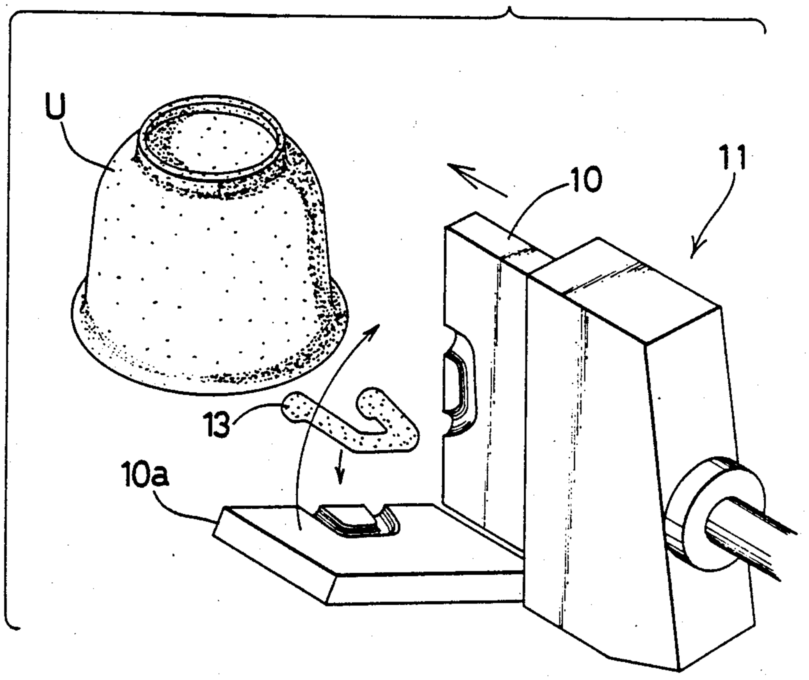
FIGS. 6(*a*) and 6(*b*) illustrate how a handle is connected to a cup body.
Figure 6:
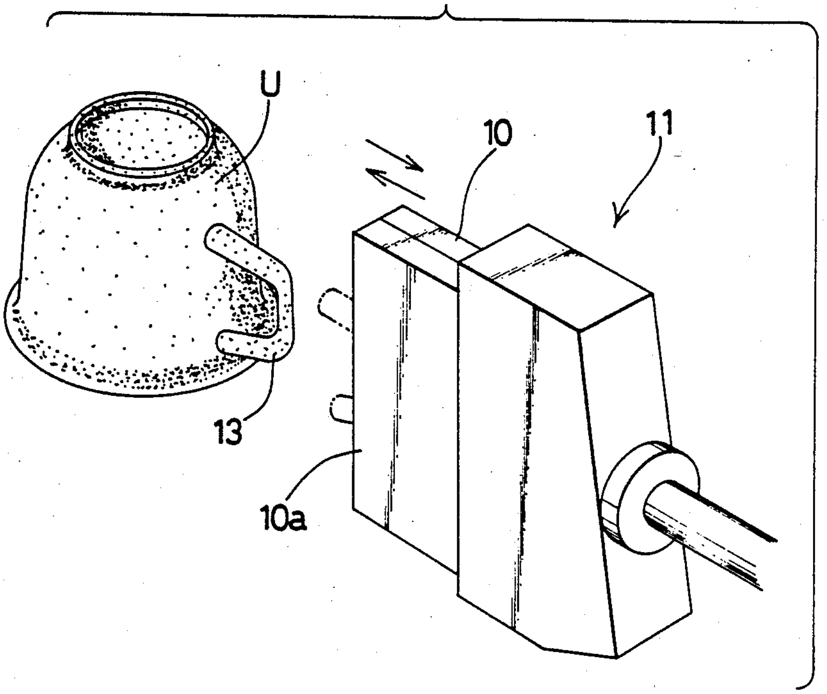

A handle connecting apparatus 11 is located adjacent to the position D. The handle connecting apparatus 11 comprises a pair of handle connecting means. Each handle connecting means includes a fixed plate 10 and a plate **10*a* pivotally connected to the fixed plate 10** (FIGS. 6(*a*) and 6(*b*)). The plates 10 and **10*a* are provided with grooves to accommodate and hold together a handle 13 to be connected to the cup body U. The plate 10*a* may be opened and closed. The plates 10 and 10*a* may be moved toward or away from the cup body U. Also, handles 12 are operated to locate the plates 10 and 10*a* at starting positions from which to move the plates 10 and 10*a* toward the cup body U. Thus the starting positions of the plates 10 and 10*a* may be determined for various cup bodies of difference sizes by operating the handles 12. Before the handle 13 is held by the plates 10 and 10*a*, a slurry is applied, as an adhesive material, to the portions of the handle which are to be connected to the cup body U. Thence the plate 10a is opened, and the handle 13 is set in the groove of the plate 10a. Then, the plate 10a is closed. The grooves of the two plates 10 and 10a thus accommodate and hold the handle 13 together. Thence the plates 10 and 10a are moved toward the cup body U to connect the handle 13 to the cup body U. When the handle 13 has been connected thereto, the plate 10a is opened and the plates 10 and 10a** are retracted.

Figure 7:
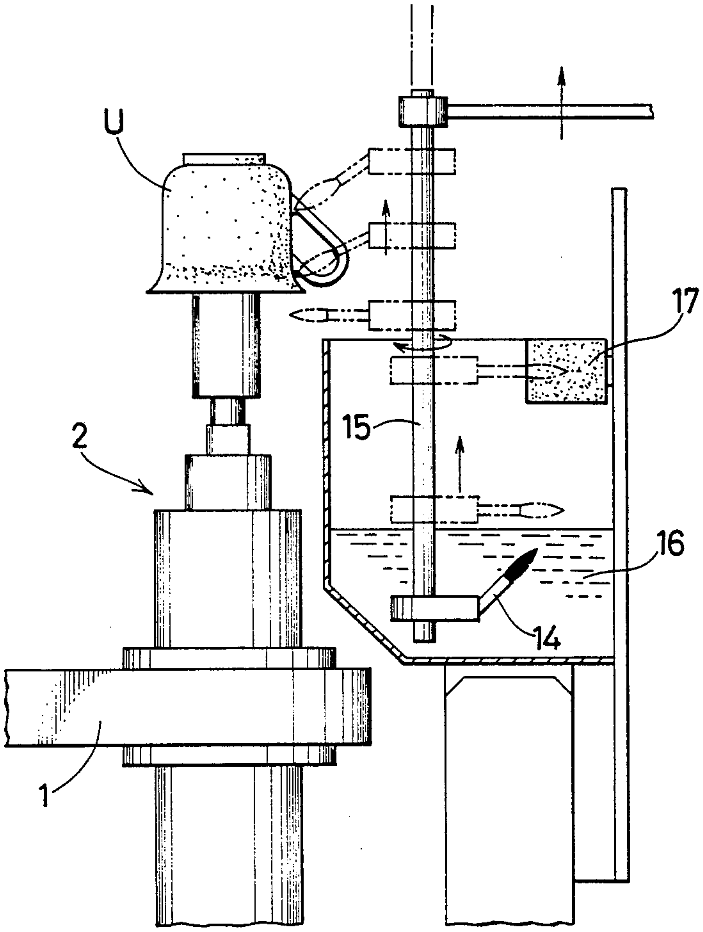
FIG. 7 shows an apparatus for removing a surplus of a slurry from an assembled cup.
Figure 8:
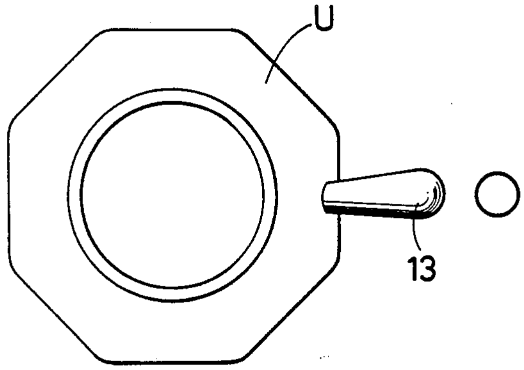
FIG. 8(*a*) shows a handle connected to a cup body orientated in a right direction.
Figure 8:
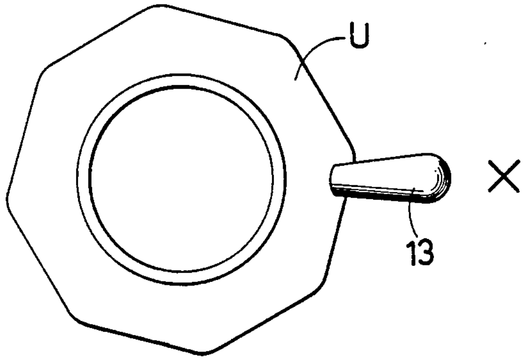

The cup bodies C now having the handles 13 are moved to the next position E. A surplus removing apparatus is located adjacent to the position E. The surplus removing apparatus includes a pair of vertical rods 15 each having a lower portion located in a tank 16 and an upper portion projecting from the tank 16. Each rod 15 is not only vertically movable, but also rotatable about its axis. FIG. 7 shows one of the rods 15. A brush 14 is connected to the lower end of the rod 15. The tank 16 contains water 16. When the rod 15 is in its lowest position, the brush 14 is in the water 16 (FIG. 7). In conjunction with the rod 15, a roller 17 is provided in the upper portion of the inner space in the tank 15. When the rod 15 is moved upwardly, the brush 14 is moved upwardly from within the water 16, and is rubbed against the roller 17. Much of the water is thus removed from the brush 14. Thence the rod 15 is rotated for 180 degrees to rotate the brush 14 for the same degrees. Thence the rod 15 is further moved upwardly to cause the brush 14 to rub along the cup U. The brush 14 thus removes the surplus of the slurry forced out of the portions of the handle 13 which have been connected to the cup body U.

Thence the cup U is moved to the final position F where the cup C is removed from the seat 3.

All the foregoing apparatuses and mechanisms except the cup-body orientating mechanism are well known in the art. Only the cup-body orientating mechanism is the invention of the inventor hereof. Thus the orientating mechanism will now be described in more detail.

First a sample cup body is selected. In the position A the sample is manually installed on one of the seats 3 not only so that the sample is centered on the seat 3, but also so that the sample is orientated in the right direction for the connection of a handle thereto. Orientating the sample in the right direction for the connection of a handle thereto means orientating the sample such that when the sample has reached the position D, a handle will be correctly connected to the predetermined position on the side wall of the sample only by advancing the plates 10 and 10a (of the handle connecting apparatus) holding the handle 13. Needless to say, therefore, in the position A the sample is so orientated that the predetermined position on the side wall thereof on which to connect the handle 13 faces the circumferential edge of the turntable 1. Thence the sample is moved to the position C. The scanner 5 is operated to cause a laser beam to impinge on a selected initial point on the side wall of the sample. The "selected initial point" on the side wall of the sample may be a point of any height thereon if the sample is a polygonal cup body with side edges which extend continuously from the top of the cup body to the bottom thereof. However, if the sample is a cup body which is not a polygonal one, but is a cylindrical one with a projecting design, the scanner 5 is operated to cause the laser beam to impinge on a point on the peripheral line on the side wall of the sample which exists in a horizontal plane and contains the projecting design or a portion thereof.

Following the impingement of the laser beam on the selected initial point on the sample, the sample is rotated for 360 degrees. By the scanner 5 the laser beam is generated and impinged on the sample a number of times while the sample is being rotated. For example, the scanner 5 may impinge the laser beam thereon 1,250 times, including the initial impingement, while the sample is rotated for 360 degrees. In other words, the scanner 5 may impinge the laser beam on 1,250 points on the sample which are equally spaced apart from one another, while the sample makes one rotation.

Thus, the sample is scanned along a periphery of the side wall thereof. While the sample is thus scanned, reflected lights resulting from the impingement of the laser beam on the sample are received by the scanner 5. Responding to the reflected lights received, the scanner 5 generates detection signals. The detection signals are sent to the laser displacement meter 6. Responding to the detection signals received, the laser displacement meter 6 provides, through the A-D converter 7, the computer 8 voltage signals which represent, or correspond to, the peripheral configuration of the side wall of the sample.

The laser displacement meter 6 is so set as to provide the computer 0-volt signals when the meter 6 has received detection signals which represent the reference surface of the sample cup body. The "reference surface" of the cup body herein means the portion or portions of the scanned periphery of the side wall thereof which are nearest to the central axis of the cup body.

Figure 4:
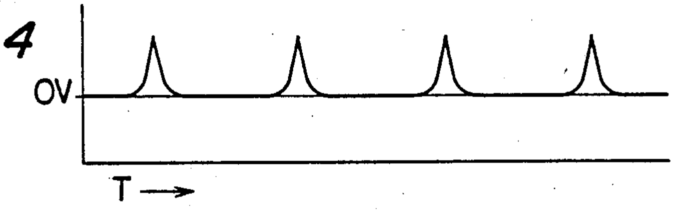
FIG. 4(*a*) shows a waveform formed by voltage signals obtained from a sample cup body.
Figure 4:
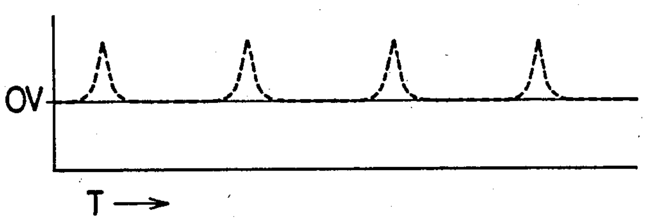
Figure 4:
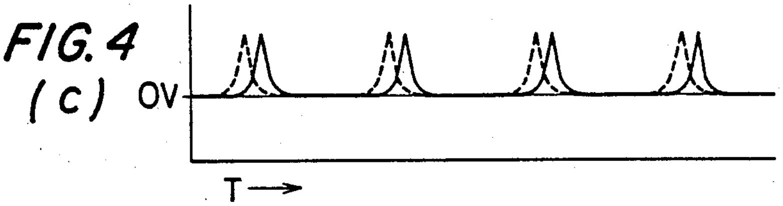

Thus, the laser displacement meter 6 may provide the computer 8 such voltage signals as shown in FIG. 4(*a*), for example.

The computer 8 is thus informed of the peripheral configuration of the sample.

The handle connecting system is now ready to automatically connect handles to connect a desired number of cup bodies represented by the sample.

First, in the position A a cup body is installed on a seat 3. Needless to say, the actual operation of assembling cup bodies and handles is made by installing two cup bodies on the respective seats 3 on each section of the turntable 1 when each section thereof has come to the position A. However, the invention will now be described with reference to only one cup body for the sake of clarity and simplicity of discussion. In the position A the cup body is installed on the seat 3 without regard to what direction the cup body is orientated. Thence the cup body is moved to the next position B, where the cup body is exactly centered on the seat 3 if in the position A it has not been exactly centered thereon. Thence the cup body is moved to the next position C. In the position C the cup body is rotated for 360 degrees while the cup body is scanned by the scanner 5 along the same peripheral line thereof as the sample cup body has been scanned and in the same manner as the sample cup body. Also, as the cup body is thus scanned, the computer 8 is informed of the peripheral configuration of the cup body in the same manner as it has been informed of the peripheral configuration of the sample cup body. That is, as the cup body is scanned, the scanner 5 responds to reflected lights therefrom by generating detection signals. In response to the detection signals, the laser displacement meter 6 provides the computer 8 voltage signals representing the peripheral configuration of the cup body through the A-D converter 7.

Figure 5:
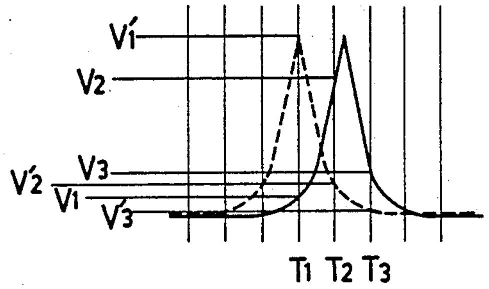
FIG. 5 illustrates calculations made to orientate the cup body.

The cup body scanned just now will be called a "cup body P" to avoid confusion with the sample cup body. The computer 8 now has a knowledge of the peripheral configurations of the sample cup body and of the cup body P in terms of voltage. Needless to say, since the sample cup body and the cup body P have been scanned along the same peripheral lines, the peripheral configurations of the two cup bodies which have become known to the computer 8 are the same. However, since in the position A the cup body P has been installed on the seat 3 irrespective of whether the cup body P is orientated in the right or wrong direction, it is very probable that the voltage signals representing the cup body P disagree with the "reference signals", or the voltage signals representing the sample cup body, in respect of the time of occurrence when the two signals are compared. Needless to say, such a disagreement shows that in the position A the cup body P has been installed on the seat 3 in the wrong orientation. For example, the voltage signals of the cup body P may disagree with the reference signals as shown in FIG. 4(*c*) in respect of the time of occurrence. For the sake of description, suppose waves shown by solid lines of FIG. 4(*c*) are the reference signals and waves shown by broken lines thereof are the voltage signals of the cup body P. The computer 8 calculates the differences between the voltages represented by the reference signals and the voltages represented by the signals of the cup body P at 1,250 different points of time corresponding to the 1,250 equally-spaced points on each cup body on which the laser beam has actually impinged. In FIG. 5, for example, the difference between a voltage $V_1$ (the reference signals) and a voltage $V_1'$ (the signals of the cup body P) is calculated at a point of time $T_1$. The computer 8 sums up the differences calculated thereby. Then, the computer 8 moves the entire waveform of the cup body P, relative to that of the sample cup body, by the distance equal to the space between two successive points of time. Then, the computer 8 makes the same operation as before. That is, the computer 8 calculates the differences between the voltages obtained from the sample cup body and the voltages obtained from the cup body P at the foregoing 1,250 different points of time, and sums up the differences calculated. The computer 8 makes the same operation with the waveform of the cup body P located at 1,250 different positions relative to the waveform of the sample cup body which are determined by the 1,250 different points of time. As a result, the computer 8 has 1,250 sum totals of voltage differences. Thence the computer 8 informs the controller 9 of the number of times of moving the waveform of the cup body P which resulted in the value of the sum total of voltage differences being zero. And the controller 9 causes the pulse motor 2*d* to rotate the cup body P by the angle corresponding to the foregoing number of times of moving the waveform thereof. The cup body P is thus orientated in the right direction.

Thence the cup body P is moved to the position E. A handle is correctly connected to the predetermined position on the side wall of the cup body P only by advancing the plates 10 and 10*a* (of the handle connecting apparatus) holding the handle 13.

A cup assembled by the system is ready for the firing operation.

Correspondingly to the number of points of measurement on the cup body, it may be arranged that the pulse motor 2*d* is rotated for 360 degrees by 1,250 pulses. Such an arrangement may facilitate the operation of orientating the cup body.

It will be appreciated that the cup-body orientating mechanism according to the invention may be used not only for a turntable-type handle-connecting system as illustrated in FIG. 1, but also for a handle connecting system with a table which moves linearly. Also, the orientating mechanism hereof may be used for a cup body positioned bottom down as well as for a cup body positioned bottom up.

Also, it is not impossible to use a video sensor instead of a laser as the scanner 5. Furthermore, a peripheral configuration of a cup body may also be measured at more or less than 1,250 points on the side wall thereof. Moreover, it may be determined whether the cup body is disorientated by obtaining a differential for each point of measurement and judging whether the value of the differential is positive or negative, instead of by summing up the differences of voltages.

What is claimed is:

1. A mechanism for automatically orientating cup bodies for a system for automatically connecting handles to the cup bodies, which includes support means for supporting cup bodies and a transparent means for conveying the cup bodies from a cup-body loading position to a cup discharge position, said mechanism comprising
   (a) a cup-body rotating means,
   (b) means for measuring a peripheral configuration of a side wall of a cup body conveyed from the cup-body loading position by the transport means, while the cup body is rotated about a central vertical axis thereof by the cup-body rotating means,
   (c) a central control means for comparing the peripheral configuration of the side wall of the cup body and a peripheral configuration of a side wall of a sample cup body as determined in advance, for determining whether the two peripheral configuration coincide with each other, and for determining an angle by which the cup body is to be rotated to orientate it in a selected direction for the connection of a handle to the cup body at a predetermined position thereon if the two peripheral configurations do not coincide with each other, and
   (d) means for rotating the cup-body rotating means by said angle to orientate the cup body in the selected direction.

2. A mechanism in accordance with claim 1 wherein said measuring means comprises
   (i) scanner means for scanning a laser beam along a periphery of the side wall of the cup body, receiving reflected light resulting from the impingement of the laser beam on the cup body, and generating detection signals in response to the reflected light received, and
   (ii) means for receiving the detection signals from the scanner means and providing said central control means, in response to the detection signals, with voltage signals which represent the peripheral configuration of the cup body.

3. A mechanism in accordance with claim 2 wherein the cup-body rotating means includes a pulse motor and a pair of clutch plates which may be engaged with each other to transmit the rotation of the pulse motor to the cup body.

4. A mechanism in accordance with claim 1 wherein the cup-body rotating means includes a pulse motor and a pair of clutch plates which may be engaged with each other to transmit the rotation of the pulse motor to the cup body.

5. A mechanism according to claim 1 wherein the measuring means measures the cup side wall peripheral configuration while the cup body is rotated substantially for 360 degrees about said central vertical axis.

* * * * *